US008605392B2

(12) United States Patent
Haller

(10) Patent No.: US 8,605,392 B2
(45) Date of Patent: Dec. 10, 2013

(54) SAFETY SWITCHING ARRANGEMENT FOR OUTPUTTING A SWITCHING SIGNAL

(75) Inventor: Herbert Haller, Fichtenhof (DE)

(73) Assignee: Siemens Aktiengesellschaft, Munich (DE)

(*) Notice: Subject to any disclaimer, the term of this patent is extended or adjusted under 35 U.S.C. 154(b) by 443 days.

(21) Appl. No.: 13/056,406

(22) PCT Filed: Jun. 8, 2009

(86) PCT No.: PCT/EP2009/056990
§ 371 (c)(1),
(2), (4) Date: Jan. 28, 2011

(87) PCT Pub. No.: WO2010/012536
PCT Pub. Date: Feb. 4, 2010

(65) Prior Publication Data
US 2011/0134573 A1 Jun. 9, 2011

(30) Foreign Application Priority Data

Aug. 1, 2008 (EP) .................................. 08013874

(51) Int. Cl.
H02H 3/00 (2006.01)
(52) U.S. Cl.
USPC ........................................................ 361/18
(58) Field of Classification Search
USPC ........................................................ 361/18
See application file for complete search history.

(56) References Cited

U.S. PATENT DOCUMENTS

| 5,200,878 | A | * | 4/1993 | Sasagawa et al. | 361/98 |
| 5,351,162 | A | * | 9/1994 | Koishikawa | 361/18 |
| 5,608,595 | A | * | 3/1997 | Gourab et al. | 361/79 |
| 6,275,958 | B1 | * | 8/2001 | Carpenter et al. | 714/48 |
| 2008/0151454 | A1 | * | 6/2008 | Uhl | 361/87 |
| 2008/0165464 | A1 | | 7/2008 | Veil | |
| 2011/0134573 | A1 | * | 6/2011 | Haller | 361/18 |

FOREIGN PATENT DOCUMENTS

| DE | 19508841 A1 | 9/1996 |
| DE | 102005030276 A1 | 12/2006 |
| JP | 10227844 A | 8/1998 |
| JP | 2000072020 A | 3/2000 |

(Continued)

OTHER PUBLICATIONS

International Search Report.

(Continued)

Primary Examiner — Ronald W Leja
(74) Attorney, Agent, or Firm — Harness, Dickey & Pierce, P.L.C.

(57) ABSTRACT

A safety switching arrangement that outputs a switching signal a switch or safety-oriented interruption of a circuit to control disconnection of a power supply for a load. The safety switching arrangement includes at least one evaluation circuit which emits an unsafe drive signal for the switch at an output. The safety switching arrangement also includes a programmable logic unit supplied with the drive signal(s) at an input and connected to the switch to drive the switch with a safe drive signal. The programmable logic unit can test and monitor the correct function of the switch during operation. A safe non-floating first terminal of the switch is connected to a respective feedback input of the programmable logic unit to monitor the potential state of said terminal. The relevant potential state during error-free operation corresponds to the safe drive signal for the at least one switch.

18 Claims, 2 Drawing Sheets

(56) References Cited

FOREIGN PATENT DOCUMENTS

| JP | 2006219052 A | 8/2006 |
| JP | 2007037311 A | 2/2007 |
| JP | 2008006998 A | 1/2008 |
| JP | 2008133741 A | 6/2008 |

OTHER PUBLICATIONS

PCT/EP2009/056990 filed Jun. 8, 2009.
European Patent Publication No. EP08013874 filed Aug. 1, 2008.

\* cited by examiner

SAFETY SWITCHING ARRANGEMENT FOR OUTPUTTING A SWITCHING SIGNAL

PRIORITY STATEMENT

This application is the national phase under 35 U.S.C. §371 of PCT International Application No. PCT/EP2009/056990 which has an International filing date of Jun. 8, 2009, which designates the United States of America, and which claims priority on European patent application number EP 08013874.6 filed Aug. 1, 2008, the entire contents of each of which are hereby incorporated herein by reference.

FIELD

At least one embodiment of the invention generally relates to a safety switching arrangement for outputting a switching signal for at least one switch for the safety-oriented (fail-safe) opening of a circuit which can be used to control the disconnection of the power supply for a load.

BACKGROUND

A safety switching arrangement is used in switchgear in order to provide increased safety. The safety switching arrangement monitors an external electrical device and switches the power supply to a load according to the monitoring result. The monitored electrical device and the load can be the same item of equipment. The safety switching arrangement does not usually switch the load directly, but indirectly via special switching devices. In particular, the safety switching arrangement controls a load-specific switching device, e.g. a motor contactor or an auxiliary relay for such a motor contactor.

The safety requirements for a safety switching arrangement are set out in IEC 13849. This standard defines different categories, with Category 4 corresponding to the highest safety level. In order to achieve Category 4, it is necessary for all the safety-relevant components of the safety switching arrangement to be of redundant design.

In a safety-oriented safety switching arrangement, a safe control signal must be applied to the switch or switches. This means that the designers of a safety switching arrangement of this kind must have detailed knowledge of the operation of safety-oriented outputs of the safety switching arrangement. Depending on the intended purpose of the safety switching arrangement, a different design of those components of the safety switching arrangement which provide the safe control signal at the output may be necessary. In particular, for the control and evaluation of so-called "dark tests", adaptation of the firmware implemented in the evaluation circuits is necessary. This procedure requires, on the one hand, valuable process time and, on the other, evaluation circuit resources.

SUMMARY

At least one embodiment of the present invention specifies a safety switching arrangement which provides a simpler way of outputting a safe switching signal for at least one switch.

At least one embodiment is directed to a safety switching arrangement. Advantageous embodiments will emerge from the dependent claims.

At least one embodiment of the invention creates a safety switching arrangement for outputting a switching signal for at least one switch for safety-oriented opening of a circuit which can be used to control the disconnection of the power supply for a load. The safety switching arrangement comprises at least one evaluation circuit which produces a respective unsafe drive signal for the at least one switch at a respective output. The safety switching arrangement also comprises a programmable logic unit which can be supplied with the drive signal(s) at a respective input and which is connected to the at least one switch in order to drive the at least one switch with a safe drive signal, the programmable logic unit being implemented as a testing and monitoring device which can test and monitor the correct functioning of the respective switch during operation. The safety switching arrangement lastly comprises a safe non-floating first terminal of the at least one switch, which terminal is connected to the respective feedback input of the programmable logic unit in order to monitor the potential state of said terminal, said potential state corresponding to the safe drive signal of the at least one switch during fault-free operation.

The safety switching arrangement according to at least one embodiment of the invention allows standardized setting and evaluation of safety-oriented outputs. The designers of safety-oriented evaluation circuits require less or absolutely no knowledge about the method of operation of safety-oriented outputs. This is made possible by separating the functionality of the evaluation circuits and the components necessary for the safety-oriented functionality which are concentrated in the programmable logic unit. The calculation or checks performed in the at least one evaluation circuit can be carried out independently of safety-oriented requirements at the output of the safety switching arrangement. An unsafe drive signal for the at least one switch is transferred to the programmable logic unit which carries out all the testing and monitoring so that a safe drive signal can be fed out by the programmable logic unit to the at least one switch. A significant advantage of this procedure is that the at least one evaluation circuit can be comprised of smaller and less expensive microprocessors.

The safety switching arrangement according to at least one embodiment of the invention can be used in Category 4 applications, which means that because of the necessity of all the safety-oriented components being of redundant design, the safety switching arrangement comprises two series-connected switches and two evaluation circuits which produce an unsafe drive signal for a respective switch at a respective output. However, the switching arrangement according to at least one embodiment of the invention can also be used in systems in which only one switch and/or one evaluation device is required.

According to one embodiment of the inventive switching arrangement, the programmable logic unit comprises at least one device for generating test pulses which can be superimposed on the at least one evaluation circuit's drive signals applied to the respective inputs of the programmable logic unit and which can be detected at the respective feedback inputs if the at least one switch is operating as intended. The checking of the designated functionality of the at least one switch can therefore take place in parallel with the operation of the at least one evaluation circuit. It is therefore no longer necessary to interrupt the operating sequence of the at least one evaluation circuit for testing and monitoring purposes.

It is additionally provided that a status of a respective terminal can be written to redundant registers of the programmable logic unit or of the at least one evaluation circuit. A secure communications protocol is preferably used for writing the status to the two registers. The writing of the status of a respective terminal to two registers constitutes a redundancy as required for Category 4 applications.

It is further provided that each of the switches is assigned an overcurrent detection device which is designed to monitor the current flowing in the respective arc gap. This makes it possible to use simple switches, in particular without integral temperature monitoring. It is cheaper to use simple switches, e.g. MOSFETs compared to so-called smart MOSFETs. The overcurrent detection device can be made of simple discrete components such as shunts, and resistors. The evaluation of the magnitude of the current and any drive signal resulting therefrom for opening the switch can take place in the programmable logic unit or even in the microcontroller.

In particular, the programmable logic unit has an in particular serial communications link to the at least one evaluation circuit. The communications link can be used for exchanging status data, faults at a respective terminal or for parameterizing the programmable logic unit. The communications link can be implemented as serial communication, e.g. SPI (Serial Peripheral Interface) or IO-Link. It is particularly advantageous if data interchange over the communications link takes place using a secure protocol. The communications link can also be used for providing the programmable logic unit with a drive signal for the at least one switch, said drive signal provided via the communications link being an unsafe drive signal. By processing in the programmable logic unit in the above described manner, this becomes a safe drive signal.

The programmable logic unit can be implemented, for example as an FPGA (Field Programmable Gate Array) or as an ASIC (Application Specific Integrated Circuit).

BRIEF DESCRIPTION OF THE DRAWINGS

The invention will now be explained in greater detail with reference to an example embodiment. In the accompanying drawings.

DETAILED DESCRIPTION OF THE EXAMPLE EMBODIMENTS

Figure 1:
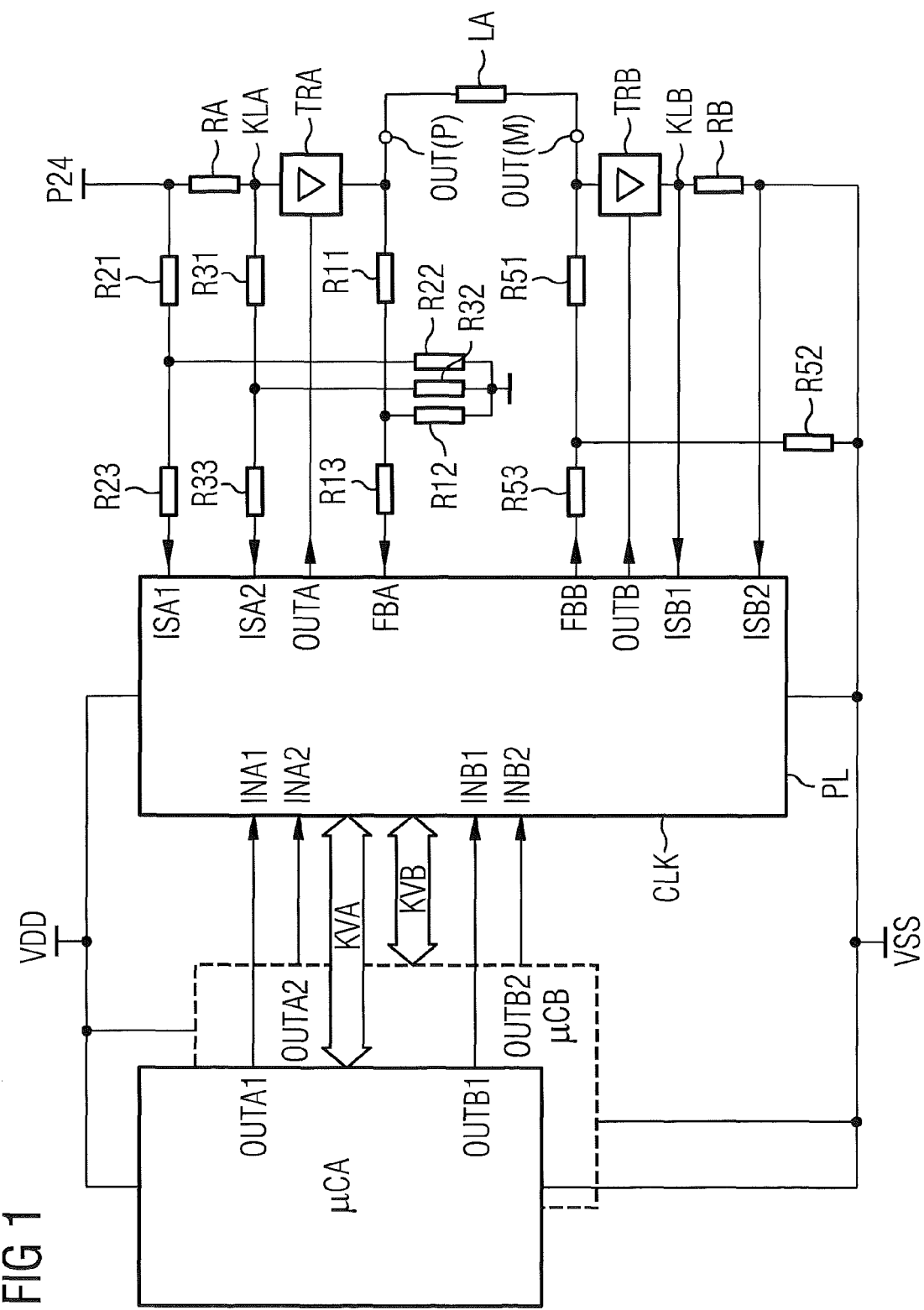
FIG. 1 shows a safety switching arrangement according to an embodiment of the invention.

The safety switching arrangement of an embodiment, in accordance with IEC 13849 Category 4, contains two per se identical evaluation circuits μCA and μCB. The evaluation circuits μCA, μCB usually comprise a microprocessor and are used for redundant control of two switches TRA, TRB of the safety switching arrangement. Each of the evaluation circuits μCA, μCB has two outputs OUTA1, OUTB1 and OUTA2, OUTB2 respectively to which a redundant unsafe drive signal for the switches TRA and TRB respectively is applied. The outputs OUTA1 of the evaluation circuit μCA and OUTA2 of the evaluation circuit μCB are assigned to the switch TRA. The outputs OUTB1 of the evaluation circuit μCA and OUTB2 of the evaluation circuit μCB are assigned to the switch TRB. Said outputs OUTA1, OUTB1, OUTA2, OUTB2 are connected to corresponding inputs INA1, INB1, INA2, INB2 of a programmable logic unit PL.

The programmable logic unit PL which can be implemented in the form of an FPGA or ASIC is designed as a testing and monitoring device which can test and monitor the correct functioning of the switches TRA and TRB during operation of the safety switching arrangement. For this purpose a safe output OUTA is connected to a control terminal of the switch TRA and a safe output OUTB is connected to a control terminal of the switch TRB. The safe drive signal applied to the outputs OUTA and OUTB is formed from the unsafe drive signals INA1 and INA2 and INB1 and INB2 respectively.

The evaluation circuits μCA and μCB and the programmable logic unit PL are connected to a supply voltage terminal VDD and a reference voltage terminal VSS.

The switches TRA and TRB are preferably semiconductor switching elements such as a MOSFET or an IGBT. The switches TRA, TRB can be implemented as intelligent semiconductor switches equipped with built-in means of monitoring their operation. Thus, for example, smart MOSFETs are known which have integral temperature monitoring causing the semiconductor switch in question to be opened for its own protection if a predefined limit temperature is exceeded. However, in the circuit arrangement shown in FIG. 1, the switches TRA, TRB can also be implemented as simple semiconductor switches without built-in protection function.

Overload protection for the switches TRA, TRB can be provided by shunt resistors RA and RB respectively connected in series with the particular arc gap. The arc gap of the switch TRA is formed between a first terminal OUT(P) and a second terminal KLA. The arc gap of the switch TRB is formed between a first terminal OUT(M) and a second terminal KLB. The shunt resistor RA is connected between the second terminal KLA and a supply voltage terminal P24. The shunt resistor is connected between the second terminal KLB of the switch TRB and a reference potential VFS.

For measuring the current, the shunt resistor RA is connected by both of its terminals via a first voltage divider R21, R22 and a first series resistor R23 and via a second voltage divider R31, R32 and a second series resistor R33 to inputs ISA1 and ISA2. The terminals of the shunt resistor RB are connected in a similar manner to inputs ISB1, and ISB2 for current measurement. The inputs ISA1, ISA2 and ISB1, ISB2 are part of an optional current evaluation circuit PL2 of the programmable logic unit PL which will be described below in connection with an exemplary embodiment of the programmable logic unit PL.

A load LA which represents an actuator (e.g. a motor or a contactor) is connected between the first terminals OUT(P) and OUT(M). The arrangement shown therefore corresponds to a so-called PM circuit. However, the invention is not limited to implementation in the form of a PM circuit, but can also be used in the so-called PP circuit in which the two switches TRA, TRB are connected in series and the load LA to reference potential.

The monitoring of the correct functioning of the switches TRA, TRB during their operation (i.e. while the switches TRA and TRB are rendered conducting) is made possible due to the fact that the first terminals OUT(P) and OUT(M) are connected to a respective feedback input FBA, FBB of the programmable logic unit. In order to perform voltage matching between the supply voltage P24 and the operating voltage VDD of the programmable logic unit PL, the first terminals OUT(P) and OUT(M) are each connected via a voltage divider R11, R12 and R51, R52 respectively. The resistors R13 and R53 additionally connected to the feedback inputs FBA and FBB respectively constitute series resistors.

The signal applied to the feedback inputs FBA and FBB is compared to the drive signals present at the outputs OUTA and OUTB respectively and the comparison result is written as status information to two registers in each case in order to ensure evaluation redundancy. In the event of a fault, a flag is therefore set in the status registers. The evaluation circuits μCA and μCB can be informed of the occurrence of a fault via an in particular serial communications link KVA and KVB.

Other status information can be transmitted in addition to the communication of status information to the evaluation circuits μCA and μCB via the communications links KVA and KVB. The communications links can also be used to parameterize the programmable logic unit PL. It is likewise conceivable that the drive signals for the switches PRA, PRB are not transmitted over their own communications lines, as described above, but via the communications links KVA and KVB. For this purpose it is advantageous if a secure protocol is used for communication via the communications links KVA and KVB. The communications link KVA established between the evaluation circuit μCA and the programmable logic unit PL and the communications link KVB established between the evaluation circuit μCB and the programmable logic unit PL can be implemented in accordance with the SPI, IO-Link or RS-232 standards.

Figure 2:
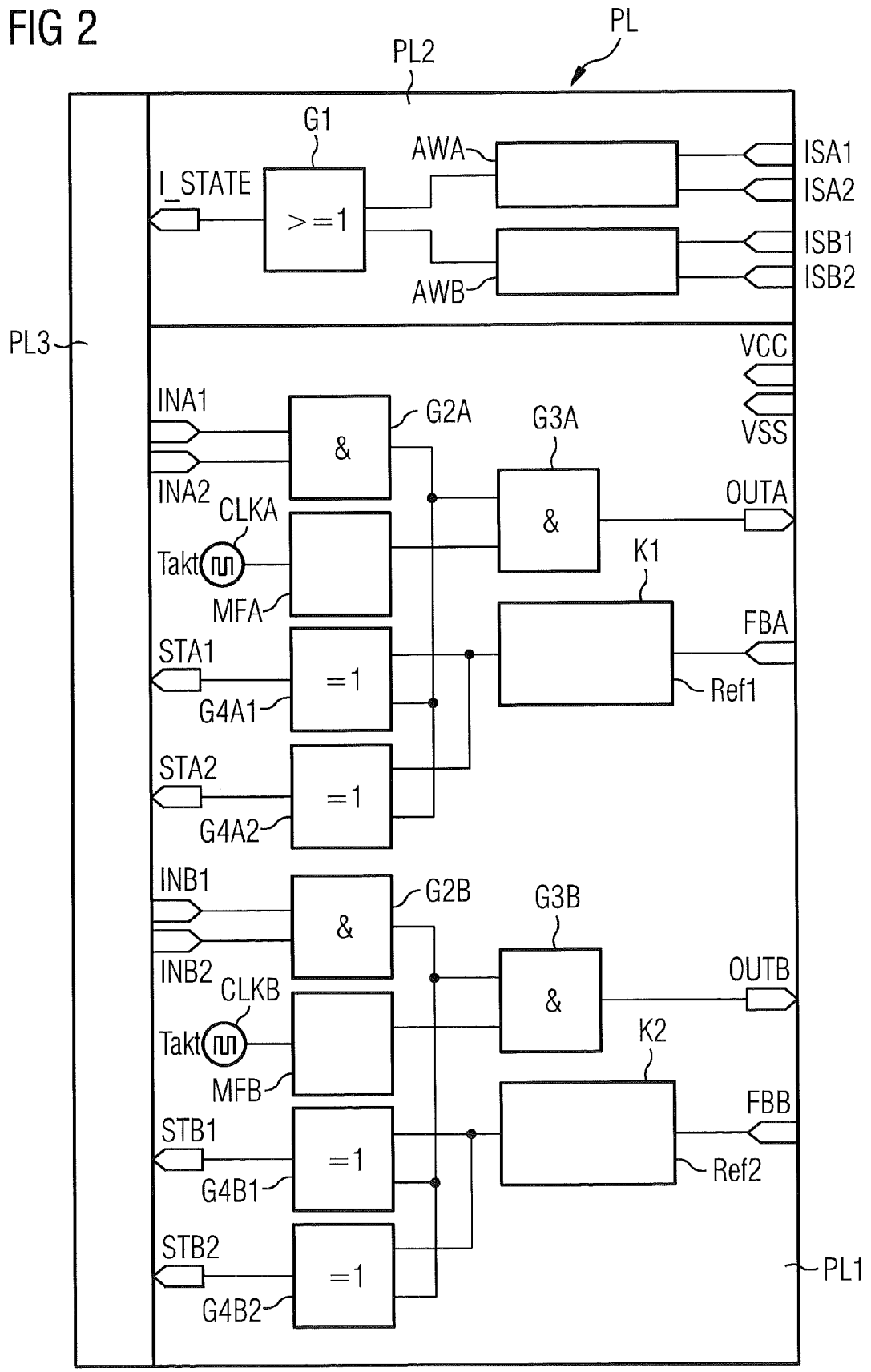
FIG. 2 shows an example of a programmable logic unit of the safety switching arrangement according to an embodiment of the invention.

FIG. 2 shows a possible variant of the programmable logic unit PL shown in FIG. 1. The programmable logic unit PL incorporates a testing and monitoring device PL1, a current evaluation circuit PL2 and an interface PL3 to the evaluation circuits μCA, μCB. While the testing and monitoring device PL1 is a necessary component of the programmable logic unit PL, the current evaluation circuit PL2 and the interface PL3 to the evaluation circuits μCA, μCB constitute optional components.

The testing and monitoring device PL1 incorporates an AND-gate G2A, the inputs of which are connected to the inputs INA1 and INA2. An output of the AND-gate G2A is connected to a first input of another AND-gate G3A and to the first inputs of two XOR-gates G4A1, G4A2. A second input of the AND-gate G3A is connected to a monoflop MFA which is coupled on the input side to a clock CLKA. An inverted signal is applied to an output of the monoflop MFA. An output of the AND-gate G3A is connected to the safe output OUTA. A first input of a comparator K1 is connected to the feedback input FBA, the signal fed to the comparator being inverted. A reference signal is applied to a second input Ref1 of the comparator K1. On the output side, the comparator K1 is connected to second inputs of the XOR-gates G4A1 and G4A2 in each case. An output of the XOR-gate G4A1 is connected to a status input STA1. Similarly, an output of the XOR-gate G4A2 is connected to a status input STA2. The status inputs STA1, STA2 are connected to the status registers already mentioned which in this example are provided in the microcontroller μCA.

For redundancy purposes, the circuit section described is duplicated in the testing and monitoring device PL1.

For this purpose the inputs INB1, INB2 are connected to inputs of an AND-gate G2B. An output of the AND-gate G2B is connected to a first input of an AND-gate G3B and to first inputs of two XOR-gates G4B1, G4B2. A second input of the AND-gate G3B is connected to a monoflop MFB which is coupled on the input side to a clock generator CLKB. An inverted signal is applied to the output of the monoflop MFB. An output of the AND-gate G3B is connected to the safe output OUTB. The feedback input FBB is connected to a first input of the comparator K2, the signal applied to the comparator being inverted. A reference signal is present at a second input Ref2. On the output side, the comparator K2 is connected to a second input of the gates G4B1 and G4B2 in each case. The outputs of XOR-gates G4B1, G4B2 are connected to the status inputs STB1, STB2. The status inputs STB1, STB2 are connected to two registers which, in the example, are provided in the evaluation circuit μCB.

The signals present at the status inputs STA1, STA2, STB1, STB2 are transmitted via the communications links KVA KVB, to the evaluation circuits μCA, μCB. For this purpose the programmable logic unit PL contains the interface PL3 to the evaluation circuits μCA, μCB.

The currents flowing through the electronic switches TRA, TRB are monitored in the current evaluation circuit PL2. For this purpose, the inputs ISA1, ISA2 and ISB1, ISB2 respectively are connected to respective current evaluation units AWA, AWB for current measurement. The current evaluation units AWA, AWB are used to determine a respective current through the switches TRA, TRB from the voltage differences present at the inputs ISA1, ISA2 and ISB1, ISB2 respectively and the known variables of the shunt resistors RA, RB. On the output side, the current evaluation units AWA, AWB are coupled to a gate G1 which is coupled to a current status output I_STATE. If an overcurrent through one of the electronic switches TRA, TRB is detected, a corresponding signal is applied to the current status output I_STATE. The status signal is preferably transmitted via one or both communications links KVA, KVB. This can also be evaluated by one of the evaluation circuits μCA, μCB. In the event of an overcurrent, the switch affected or both electronic switches TRA, TRB are opened.

The testing and monitoring device PL1 operates as follows. During normal operation of the safety switching arrangement, a logical "1" signal is present at the inputs INA1 and INA2, causing a logical "1" to be likewise present at the output of the AND-gate G2A and at the first inputs of the XOR-gates G4A1 and G4A2. If a logical "1" signal is likewise present at the output of the monoflop MFA, the electronic switch TRA is rendered conducting (closed) because of the logical "1" signal present at the output of the AND-gate G3A.

To test the electronic switch, a logical "0" signal is briefly generated by the monoflop MFA, e.g. for a period of between 300 and 500 ms, so that for this brief period a logical "0" is present at the output of the AND-gate G3A and the electronic switch TRA is rendered nonconducting (opened). This superimposition produces a change in potential at the first terminal OUT(P) which can be detected at the feedback input FBA. The logical "0" present at the terminal OUT(P) because of the nonconduction of the electronic switch TRA is inverted and fed to the first input of the comparator K1. Because of the reference signal present at the second input Ref1 of the comparator K1, a logical "0" is present at the output of the comparator K1 so that, in combination with the logical "1" at the first input, a logical "1" is produced at the output of the gates G4A1 or G4A2 as the case may be. A logical "1" can therefore be read off at the status input STA1 and STA2, which indicates that the electronic switch TRA is operating as intended.

The other circuit section of the testing and monitoring device PL1 operates in a similar manner.

If the switch TRA is not operating as intended, a logical "0" would be present at the status input STA1, STA2.

Depending on how the reference signal Ref1 is implemented, as-intended or defective operation of the electronic switch TRA could also be indicated in inverse manner.

An overcurrent through each of the electronic switches TRA, TRB can be detected by the current evaluation circuit PL2, thereby in particular enabling destruction of the switches TRA, TRB to be prevented even if they are implemented as simple semiconductor switches which have no safety electronics of their own.

An advantage of the safety switching arrangement according to an embodiment of the invention is that the driving and evaluation of the safety-oriented outputs is standardized. This means that designers of safety-oriented controls require much less know-how about safety-oriented outputs. In addition, by decoupling the testing and monitoring device from the evaluation circuits, smaller and therefore cheaper evaluation circuits such as microcontrollers or microprocessors can be used. By incorporating a serial interface into the programmable logic unit, the number of evaluation circuits necessary for complex safety systems can be reduced. There is also a speed advantage, as the testing and monitoring function can take place in parallel with control by the evaluation device.

Another advantage is that a safety switching arrangement according to of an embodiment of the invention requires less space on the circuit substrate compared to conventional safety switching arrangements. Moreover, artwork design complexity can be reduced. All the testing and monitoring functions are controlled and evaluated by the programmable logic unit, only the evaluation result being communicated to the evaluation circuit(s), thereby relieving the burden on the evaluation circuit(s).

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE CHARACTERS

μCA evaluation circuit (microcontroller)
μCB evaluation circuit (microcontroller)
VDD supply voltage
VSS reference potential
P24 supply voltage
OUTA1 unsafe output (drive signal for driver)
OUTB1 unsafe output (drive signal for driver)
PL programmable logic unit
PL1 testing and monitoring device
PL2 current evaluation circuit
PL3 interface to evaluation circuits
INA input (drive signal for driver)
INB input (drive signal for driver)
INA1 input (drive signal for driver)
INA2 input (drive signal for driver)
INB1 input (drive signal for driver)
INB2 input (drive signal for driver)
OUTA safe output (drive signal for driver)
OUTB safe output (drive signal for driver)
FBA feedback input (drive signal for driver)
FBB feedback input (drive signal for driver)
TRA electronic switch
TRB electronic switch
OUT(P) first terminal
OUT(M) first terminal
KLA second terminal
KLB second terminal
LA load
R11 resistor
R12 resistor
R13 resistor
R21 resistor
R22 resistor
R23 resistor
R31 resistor
R32 resistor
R33 resistor
R51 resistor
R52 resistor
R53 resistor
ISA1 input for current measurement
ISA2 input for current measurement
ISB1 input for current measurement
ISB2 input for current measurement
AWA current evaluation unit
AWB current evaluation unit
G1 gate
K1 comparator
Ref1 reference input
G2A AND-gate
G3A AND-gate
G4A1 XOR-gate
G4A2 XOR-gate
K2 comparator
Ref2 reference input
G2B AND-gate
G3B AND-gate
G4B1 XOR-gate
G4B2 XOR-gate
CLKA clock
CLKB clock
MFA monoflop
MFB monoflop
KVA communications link
KVB communications link
RA shunt resistor
RB shunt resistor
STA1 status input
STA2 status input
STB1 status input
STB2 status input
I_STATE current status output

What is claimed is:

1. A safety switching arrangement for outputting a switching signal for at least one switch for safety-oriented opening of a circuit which is useable to control the disconnection of a power supply of a load, comprising:
at least one evaluation circuit configured to produce a respective unsafe drive signal for the at least one switch at a respective output;
a programmable logic unit, suppliable with the drive signals at a respective input and operatively connected to the at least one switch, configured to drive the at least one switch with a safe drive signal, said programmable logic unit being implemented as a testing and monitoring device to test and monitor correct functioning of a respective one of the at least one switch during operation; and
a safe non-floating first terminal of the at least one switch, the safe non-floating first terminal being operatively connected to a respective feedback input of the programmable logic unit in order to measure said terminal's potential state, said potential state corresponding to the safe drive signal of the at least one switch during fault-free operation.

2. The switching arrangement as claimed in claim 1, wherein the switching arrangement comprises two series connected switches and the load is between the series connected switches.

3. The switching arrangement as claimed in claim 1, wherein the switching arrangement comprises two evaluation circuits to each produce a respective unsafe drive signal for a respective one of the at least one switch at a respective output.

4. The switching arrangement as claimed in claim 1, wherein the programmable logic unit includes at least one device to generate test pulses, superimposeable on drive signals of the at least one evaluation circuit, which are present at the respective inputs of the programmable logic unit and which are detectable at the respective feedback inputs if the at least one switch is operating as intended.

5. The switching arrangement as claimed in claim 1, wherein a status of each respective terminal is writeable to registers of the programmable logic unit or of the at least one evaluation circuit.

6. The switching arrangement as claimed in claim 1, wherein each of the at least one switches is assigned an overcurrent protection device, designed to monitor the current flowing in a respective arc gap of the respective at least one switch.

7. The switching arrangement as claimed in claim 1, wherein the programmable logic unit includes a communications link to the at least one evaluation circuit.

8. The switching arrangement as claimed in claim 7, wherein data interchange over the communications link takes place using a secure protocol.

9. The switching arrangement as claimed in claim 1, wherein the programmable logic unit is implemented as an FPGA or ASIC.

10. The switching arrangement as claimed in claim 2, wherein the switching arrangement comprises two evaluation circuits to each produce a respective unsafe drive signal for a respective one of the at least one switch at a respective output.

11. The switching arrangement as claimed in claim 2, wherein the programmable logic unit includes at least one device to generate test pulses, superimposeable on drive signals of the at least one evaluation circuit, which are present at the respective inputs of the programmable logic unit and which are detectable at the respective feedback inputs if the at least one switch is operating as intended.

12. The switching arrangement as claimed in claim 2, wherein a status of each respective terminal is writeable to registers of the programmable logic unit or of the at least one evaluation circuit.

13. The switching arrangement as claimed in claim 2, wherein each of the at least one switches is assigned an overcurrent protection device, designed to monitor the current flowing in a respective arc gap of the respective at least one switch.

14. The switching arrangement as claimed in claim 7, wherein the communications link is a serial communications link.

15. The switching arrangement as claimed in claim 14, wherein data interchange over the communications link takes place using a secure protocol.

16. The switching arrangement as claimed in claim 2, wherein the programmable logic unit is implemented as an FPGA or ASIC.

17. The switching arrangement as claimed in claim 1, wherein the programmable logic unit is configured to carry out all testing and monitoring within the safety switching arrangement.

18. The switching arrangement as claimed in claim 1, wherein the safe drive signal is output from the programmable logic unit to the at least one switch and is formed from the unsafe drive signal which are input into the programmable logic unit from the at least one evaluation circuit.

* * * * *